(12) United States Patent
Kang et al.

(10) Patent No.: US 9,672,128 B2
(45) Date of Patent: Jun. 6, 2017

(54) MULTI-CORE DEVICE, TEST DEVICE, AND METHOD OF DIAGNOSING FAILURE

(71) Applicant: Industry-Academic Cooperation Foundation, Yonsei University, Seoul (KR)

(72) Inventors: Sungho Kang, Seoul (KR); Taewoo Han, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 44 days.

(21) Appl. No.: 14/158,170

(22) Filed: Jan. 17, 2014

(65) Prior Publication Data

US 2014/0208165 A1    Jul. 24, 2014

(30) Foreign Application Priority Data

Jan. 18, 2013 (KR) .................. 10-2013-0006036

(51) Int. Cl.
*G06F 11/00* (2006.01)
*G06F 11/22* (2006.01)
*G06F 11/267* (2006.01)

(52) U.S. Cl.
CPC ........ *G06F 11/2242* (2013.01); *G06F 11/267* (2013.01)

(58) Field of Classification Search
CPC ..... G06F 11/26; G06F 11/267; G06F 11/2242
USPC .......................................................... 714/37
See application file for complete search history.

(56) References Cited

U.S. PATENT DOCUMENTS

| | | | | |
|---|---|---|---|---|
| 4,484,330 A | * | 11/1984 | Moy | ............................. 714/797 |
| 5,305,325 A | * | 4/1994 | Roos | ...................... H04Q 11/04 |
| | | | | 714/703 |
| 5,825,889 A | * | 10/1998 | Dent | ............................. 380/270 |
| 6,408,402 B1 | * | 6/2002 | Norman | .......................... 714/10 |
| 7,685,487 B1 | | 3/2010 | Kuo et al. | |
| 7,689,884 B2 | | 3/2010 | Seuring | |
| 8,214,703 B2 | | 7/2012 | Gala et al. | |
| 2005/0108609 A1 | * | 5/2005 | Thalmann | ...................... 714/742 |
| 2010/0052724 A1 | * | 3/2010 | Mizuno | ............ G01R 31/31703 |
| | | | | 324/750.3 |

(Continued)

FOREIGN PATENT DOCUMENTS

| | | |
|---|---|---|
| JP | 2004518222 A | 6/2004 |
| JP | 2010126012 A | 6/2010 |

(Continued)

OTHER PUBLICATIONS

"Test Access Mechanism for Multiple Identical Cores", Grady Giles et al. Intenational Test Conference, 2008 IEEE.*

(Continued)

*Primary Examiner* — Yair Leibovich
(74) *Attorney, Agent, or Firm* — Harness, Dickey & Pierce, P.L.C.

(57) ABSTRACT

Provided is a multi-core device. The multi-core device includes: a plurality of cores outputting a test response value by receiving a test pattern value; a majority analyzer outputting a value corresponding to a majority of the test response value by analyzing the test response value; and a determination unit determining a core outputting a test response value different from the value corresponding to the majority among the plurality of cores.

26 Claims, 13 Drawing Sheets

(56) References Cited

U.S. PATENT DOCUMENTS

| | | | |
|---|---|---|---|
| 2011/0149847 A1* | 6/2011 | Pietsch | H04L 1/16 |
| | | | 370/328 |
| 2012/0027380 A1* | 2/2012 | Marsh | G06F 17/3002 |
| | | | 386/241 |
| 2013/0159799 A1* | 6/2013 | Brown et al. | 714/726 |

FOREIGN PATENT DOCUMENTS

| | | |
|---|---|---|
| JP | 2010218277 A | 9/2010 |
| KR | 1993-0012136 B1 | 12/1993 |

OTHER PUBLICATIONS

Giles, Grady et al. "Test Access Mechanism for Multiple Identical Cores," International Test Conference, 2009, p. 1-10, IEEE.

Sharma, Manish et al. "A Novel Test Access Mechanism for Failure Diagnosis of Multiple Isolated Identical Cores," International Test Conference, 2011, p. 1-9, IEEE.

* cited by examiner

MULTI-CORE DEVICE, TEST DEVICE, AND METHOD OF DIAGNOSING FAILURE

CROSS-REFERENCE TO RELATED APPLICATIONS

This U.S. non-provisional patent application claims priority under 35 U.S.C. §119 of Korean Patent Application No. 10-2013-0006036, filed on Jan. 18, 2013, the entire contents of which are hereby incorporated by reference.

BACKGROUND OF THE INVENTION

The present invention disclosed herein relates to a multi-core device, a test device, and a method of diagnosing failure.

Even if some cores fail among a plurality of cores, a multi-core device blocks the corresponding failed cores in a system so as not to affect the remaining normal cores and to operate normally. Accordingly, the multi-core device determines failed cores through an accurate failure diagnosis and replaces them with normal cores or blocks them. While taking some performance loss into account, the multi-core device may be used.

A homogeneous multi-core device diagnoses a plurality of cores in parallel by applying the same test pattern value and thus test costs are reduced. However, even if the same test pattern value is applied, a test response value outputted from each core may vary depending on whether a core fails.

A typical multi-core device failure diagnosis uses an on-chip comparator for testing a core by comparing a test response value of a core and an expected value to text a core. If no failure occurs, since it is expected that a plurality of cores output the same test response value with respect to the same test pattern value, the plurality of cores may be tested in parallel by comparing an expected value and a test response value of a corresponding core for each core through a comparator.

However, in order to transmit expected values from the inside to the outside of a chip, additional test pins are required for a test device and a test target chip. Therefore, the increased number of test pins may cause a rise in the test costs.

SUMMARY OF THE INVENTION

The present invention provides a multi-core device whose number of test pins is not increased although the number of cores is increased, a test device, and a failure diagnosing method.

The present invention also provides a multi-core device whose test time is not increased even when the number of cores is increased, a test device, and a failure diagnosing method.

Embodiments of the present invention provide multi-core devices including: a plurality of cores outputting a test response value by receiving a test pattern value; a majority analyzer outputting a value corresponding to a majority of the test response value by analyzing the test response value; and a determination unit determining a core outputting a test response value different from the value corresponding to the majority among the plurality of cores.

In some embodiments, the plurality of cores may have the same circuit structure.

In other embodiments, the plurality of cores may receive the same test pattern value.

In still other embodiments, the plurality of cores may receive the test pattern value simultaneously.

In even other embodiments, each of the plurality of cores may include at least one scan chain.

In yet other embodiments, the majority analyzer may receive a test response value that the same scan chains in the plurality of cores output.

In further embodiments, the majority analyzer may include: an adder adding the test response value; and a comparator comparing an added value and half the number of cores.

In still further embodiments, the comparator may output 1 when the added value is greater than half the number of cores and may output 0 when the added value is less than half the number of cores.

In even further embodiments, the comparator may output one of 1 and 0 when the added value is identical to half the number of cores.

In yet further embodiments, the majority analyzer may output the value corresponding to the majority to a test device connected to the multi-core device.

In yet further embodiments, the determination unit may include an XOR gate performing an XOR operation on the test response value and the value corresponding to the majority.

In yet further embodiments, the determination unit may further include a register storing an output value of the XOR gate.

In yet further embodiments, if each core includes a plurality of scan chains, the determination unit may include: a plurality of XOR gates performing an XOR operation on a test response value outputted from each scan chain and a value corresponding to a majority for a corresponding scan chain; and an OR gate performing an OR operation on output values of the plurality of XOR gates.

In yet further embodiments, the determination unit may further include a register storing an output value of the OR gate.

In yet further embodiments, the multi-core devices may further include: a first adjustment unit adjusting an applying time of the test pattern value to allow the test pattern value to be sequentially inputted to each core; a second adjustment unit adjusting an applying time of the test response value to allow the test response value to be simultaneously inputted to the majority analyzer; and a third adjustment unit adjusting an applying time of the test response value to allow the test response value to be simultaneously inputted to the determination unit.

In yet further embodiments, the first adjustment unit may include a buffer connected to an input terminal of a core.

In yet further embodiments, the second adjustment unit may include a buffer connected between an output terminal of a core and an input terminal of the majority analyzer.

In yet further embodiments, the third adjustment unit may include a buffer connected between an output terminal of a core and an input terminal of the determination unit.

In yet further embodiments, the buffer may include a D flip-flop.

In yet further embodiments, the second adjustment unit may include a counter counting the number of 1's among test response values from a core to which the test pattern value is inputted first to a core to which the test pattern value is inputted second from the last.

In yet further embodiments, the majority analyzer may receive a test response value of a core to which the test pattern value is inputted last and an output value of the counter.

In yet further embodiments, the majority analyzer may output 1 if the output value of the counter is greater than half the number of cores, may output 0 if the output value of the counter is less than half the number of cores, and may output a test response value of a core to which the test pattern value is inputted last if the output value of the counter is identical to half the number of cores.

In other embodiments of the present invention, test devices include: a test pattern value input unit inputting a test pattern value to a plurality of cores; a majority value receiving unit receiving a value corresponding to a majority of a test response value outputted from the plurality of cores in response to the test pattern value; a comparison unit comparing the value corresponding to the majority and an expected value corresponding to the test pattern value; and a diagnosis unit diagnosing a failure of the plurality of cores according to a comparison result of the comparison unit.

In some embodiments, the test pattern value input unit may input the same test pattern value to the plurality of cores.

In other embodiments, the test pattern value input unit simultaneously may input the test pattern value to the plurality of cores.

In still other embodiments, the comparison unit may output a signal notifying that the value corresponding to the majority is identical to the expected value.

In even other embodiments, the diagnosis unit may determine the plurality of cores as failed if the value corresponding to the majority is different from the expected value.

In yet other embodiments, the test device may further include a comparison data receiving unit receiving comparison data obtained by comparing a test response value outputted from each core and the value corresponding to the majority.

In further embodiments, the diagnosis unit may diagnose a failure of each core on the basis of the comparison data when the value corresponding to the majority is identical to the expected value.

In still further embodiments, the diagnosis unit may determine a core outputting a test response value identical to the value corresponding to the majority as normal and may determine a core outputting a test response value different from the value corresponding to the majority as failed.

In even further embodiments, the diagnosis unit may determine the plurality of cores as failed if the number of cores outputting a test response value identical to the value corresponding to the majority is identical to the number of cores outputting a test response value different from the value corresponding to the majority.

In still other embodiments of the present invention, failure diagnosing methods include: inputting a test pattern value to a plurality of cores; obtaining a value corresponding to a majority of a test response value outputted in response to the test pattern value; comparing the value corresponding to the majority and an expected value corresponding to the test pattern value; and diagnosing a failure of the plurality of cores according to a comparison result.

In some embodiments, the diagnosing of the failure may include determining the plurality of cores as failed when the value corresponding to the majority is different from the expected value.

In other embodiments, the methods may further include obtaining comparison data resulting from comparing a test response value outputted from each core and the value corresponding to the majority.

In still other embodiments, the diagnosing of the failure may include separately diagnosing a failure of each core on the basis of the comparison data if the value corresponding to the majority is identical to the expected value.

In even other embodiments, the diagnosing of the failure separately may include: determining a core outputting a test response value identical to the value corresponding to the majority as normal; and determining a core outputting a test response value different from the value corresponding to the majority as failed.

In yet other embodiments, the diagnosing of the failure separately further includes determining the plurality of cores as failed if the number of cores outputting a test response value identical to the value corresponding to the majority is identical to the number of cores outputting a test response value different from the value corresponding to the majority.

In even other embodiments of the present invention, a computer readable recording medium having a program recorded thereon, which implements the method.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
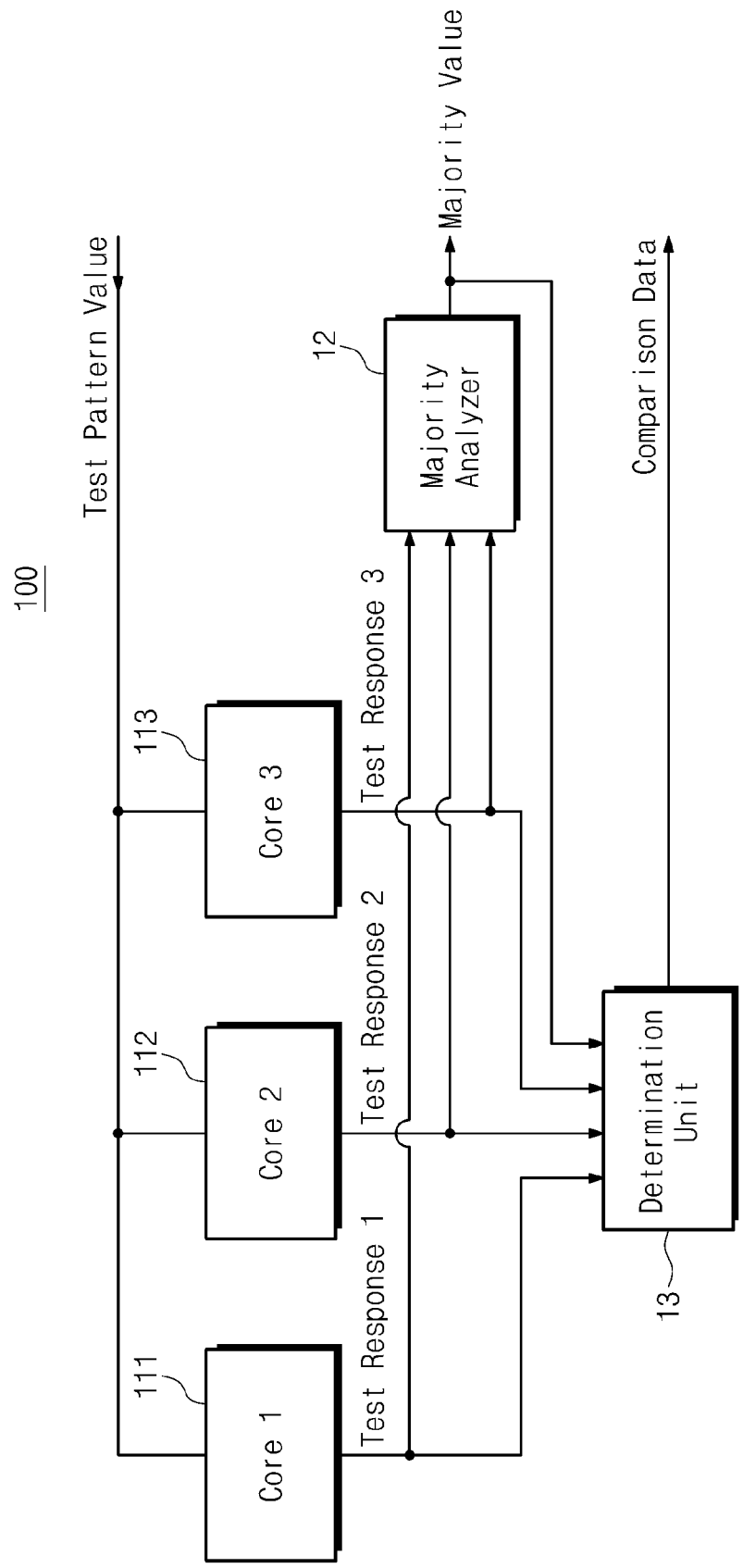
FIG. 1 is a block diagram illustrating a multi-core device according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein.

Rather, these embodiments are provided so that this disclosure will be thorough and complete, and will fully convey the scope of the present invention to those skilled in the art. Further, the present invention is only defined by scopes of claims.

If not defined, all terms (including technical or scientific terms) used herein may have the same meanings generally accepted by the typical art in the related art that the present invention pertains. Terms defined by general dictionaries are interpreted as having the same meanings in related techniques and/or this specification and even if not in a clearly defined expressions, are not interpreted as being conceptualized or excessively formal.

In the following description, the technical terms are used only for explaining specific embodiments while not limiting the present invention. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components. As used herein, the term and/or includes any and all combinations of one or more of the associated listed items.

Moreover, terms like '~element', '~device', '~block', and '~module' used in the entire specification may mean a unit for processing at least one function or operation. For example, they may mean software components or hardware components such as an FPGA or an ASIC. However, '~element', '~device', '~block', and '~module' are not limited to software or hardware. '~element', '~device', '~block', and '~module' may be configured to be stored in an addressable storage medium or may be configured to execute at least one device.

Accordingly, for example, '~element', '~device', '~block', and '~module' may include software components, object oriented software components, components such as class components and task components, processors, functions, attributes, procedures, subroutines, segments of program code, drivers, firmware, micro code, circuit, data, databases, data structures, tables, arrays, and parameters. Functions provided in components and '~element', '~device', '~block', and '~module' may be further separated with the fewer or larger number thereof.

According to an embodiment of the present invention, whether a core fails may be diagnosed based on a value (hereinafter, a majority value) corresponding to a majority in test response values outputted from a plurality of cores. As a result, a multi-core device may be tested with a test cost required for testing one core without transmitting an expected value for test pattern to a test device and increasing the number of test pins and a test time due to the increase in the number of cores.

Hereinafter, it will be described about an exemplary embodiment of the present invention in conjunction with the accompanying drawings.

FIG. 1 is a block diagram illustrating a multi-core device according to an embodiment of the present invention.

As shown in FIG. 1, the multi-core device 100 includes a plurality of cores 111, 112, and 113, a majority analyzer 12, and a determination unit 13. According to an embodiment shown in FIG. 1, although the multi-core device 100 including three cores 111, 112, and 113 is provided, the number of cores is not limited thereto.

The multi-core device 100 may be a multi-core processor and according to an embodiment of the present invention, the multi-core device 100 may include a chip or system where a plurality of cores are mounted in addition to a processor.

The plurality of cores 111, 112, and 113 may receive a test pattern value and output a test response value. The majority analyzer 12 may output a majority value in test response values by analyzing the test response value. The determination unit 13 may determine a core outputting a test response value different from the majority value among the plurality of cores 111, 112, and 113.

According to an embodiment of the present invention, the plurality of cores 111, 112, and 113 may have the same circuit structure. According to an embodiment of the present invention, the plurality of cores 111, 112, and 113 may receive the same test pattern value. The test pattern value may be inputted from a test device connected to the multi-core device 100.

According to an embodiment of the present invention, the plurality of cores 111, 112, and 113 may receive the test pattern value simultaneously. That is, the plurality of cores 111, 112, and 113 may receive a test pattern value in parallel.

Figure 2:
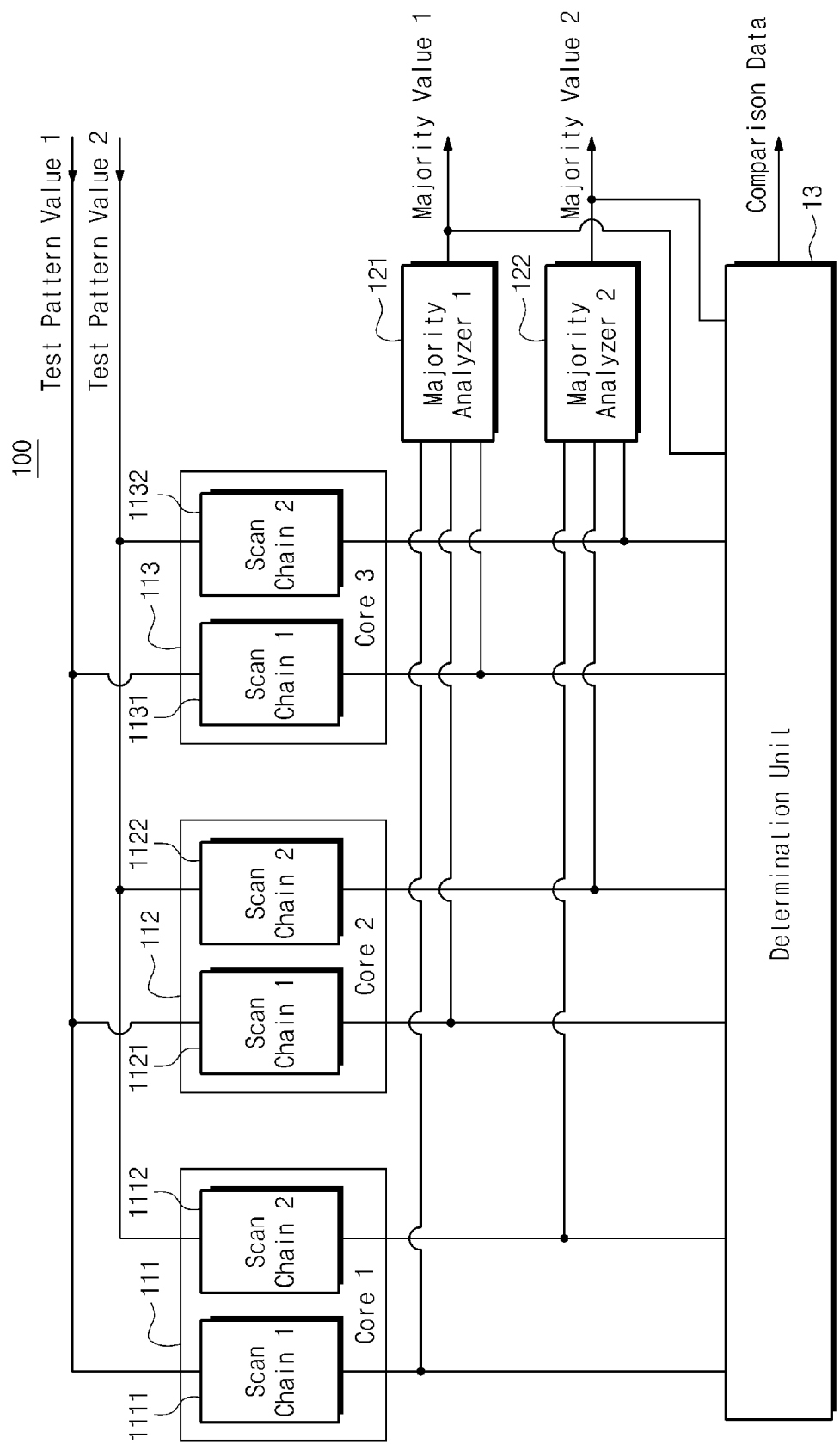
FIG. 2 is a block diagram illustrating a multi-core device according to an embodiment of the present invention.

FIG. 2 is a block diagram illustrating a multi-core device 100 according to an embodiment of the present invention.

As shown in FIG. 2, according to an embodiment of the present invention, each of the plurality of cores 111, 112, and 113 may include at least one scan chain. According to the embodiment shown in FIG. 2, although each core includes two scan chains, one core may include one scan chain or at least three scan chains.

The test pattern value may be inputted to a scan chain in the cores 111, 112, and 113 and the scan chain may output a test response value in response to the inputted test pattern value. The test pattern value may be differently inputted to a scan chain in the cores 111, 112, and 113.

For example, as shown in FIG. 2, a test pattern value 1 may be inputted to scan chains 1 1111, 1121, and 1131 in the cores 111, 112, and 113, and a test pattern value 2 may be inputted to a scan chain 2 1112, 1122, and 1132 in the cores 111, 112, and 113.

According to an embodiment of the present invention, the test pattern value and the test response value may be configured with a plurality of bits and used for parallel test access mechanism (TAM). However, according to an embodiment of the present invention, the test pattern value and the test response value may be configured with 1 bit.

According to an embodiment of the present invention, the plurality of cores 111, 112, and 113 may further include a scan cell besides the scan chain or may not include the scan chain.

The majority analyzer 12 may output a majority value in test response values by analyzing the test response value. According to an embodiment of the present invention, the majority analyzer 12 may receive a test response value outputted from the same scan chains in the plurality of cores 111, 112, and 113.

For example, referring to FIG. 2, the majority analyzer 1 121 receives a test response value outputted from the scan chain 1 1111 of the core 1 111, the scan chain 1 1121 of the core 2 112, and the scan chain 1 1131 of the core 3 113 and then outputs a majority value 1. In the same manner, the majority analyzer 2 122 receives a test response value outputted from the scan chain 2 1112 of the core 1 111, the scan chain 2 1122 of the core 2 112, and the scan chain 2 1132 of the core 3 113 and then outputs a majority value 2.

That is, the majority analyzers 121 and 122 may correspond to a scan chain in the cores 111, 112, and 113.

Figure 3:
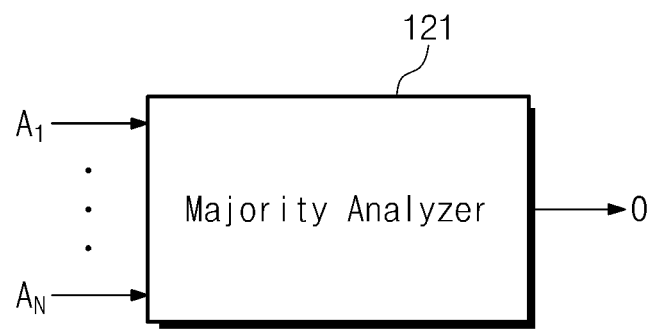
FIG. 3 is a view illustrating a majority analyzer according to an embodiment of the present invention.

FIG. 3 is a view illustrating the majority analyzer 121 according to an embodiment of the present invention.

As shown in FIG. 3, the majority analyzer 121 may output a value holding a majority in test response values 0 or 1 inputted through inputs $A_1$ to $A_N$. Here, the number N of inputs of the majority analyzer 121 may be identical to the number of cores.

Figure 4:
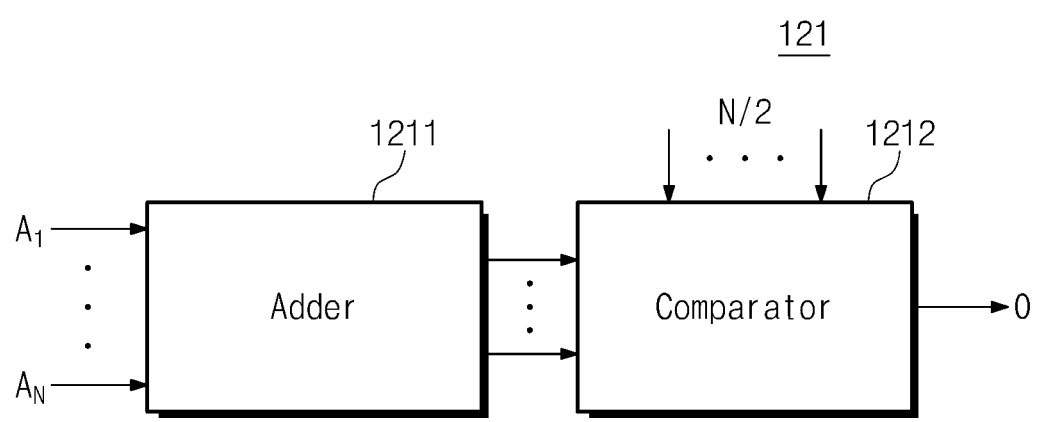
FIG. 4 is a block diagram illustrating a majority analyzer according to an embodiment of the present invention.

FIG. 4 is a block diagram illustrating the majority analyzer 121 according to an embodiment of the present invention.

As shown in FIG. 4, the majority analyzer 121 includes an adder 1211 adding an inputted test response value and a comparator 1212 comparing an added value with half of the number of cores.

The adder 1211 may count the number of 1's in a test response value inputted through inputs $A_1$ to $A_N$ and, then output the counted number. Also, the comparator 1212 outputs 1 if an output value of the adder 1211 is greater than N/2 (that is, half of the number of cores) and outputs 0 of not. According to an embodiment of the present invention, the comparator 121 may be designed to output 1 if an output value of the adder 1211 is equal to N/2 (that is, half of the number of cores).

A configuration of the majority analyzer 121 is not limited to the above embodiment and may vary according to different embodiments.

For example, the majority analyzer 121 may be designed using logic gates to output a value corresponding to a majority in inputted response values, instead of being configured with a combination of an adder and a comparator as shown in FIG. 4.

Figure 5:
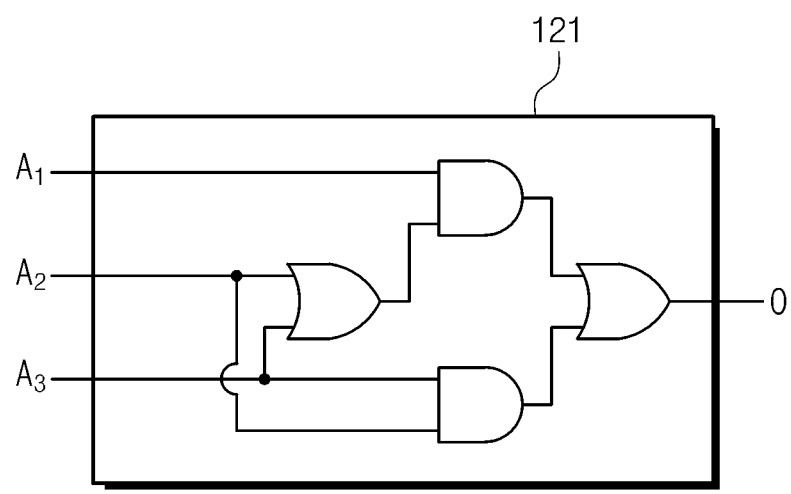
FIG. 5 is a circuit diagram illustrating a majority analyzer according to another embodiment of the present invention.

FIG. 5 is a circuit diagram illustrating the majority analyzer 121 according to another embodiment of the present invention.

As shown in FIG. 5, the majority analyzer 121 may output a majority value in test response values $A_1$, $A_2$, and $A_3$ inputted through a plurality of logic gates.

The majority analyzer 121 shown in FIG. 5 is configured to receive a test response value outputted from three cores but the number of inputs may be differently designed according to the number of cores. Additionally, when the number of cores is even and the numbers of 1' and 0's in inputted test response values are the same, the majority analyzer 121 may be designed to output one of 0 and 1.

According to an embodiment of the present invention, the majority analyzer 121 may output a majority value to a test device connected to the multi-core device 100. The test device may diagnose whether a plurality of cores fail on the basis of the majority value.

The determination unit 13 may determine a core outputting a test response value different from the majority value among the plurality of cores 111, 112, and 113.

Figure 6:
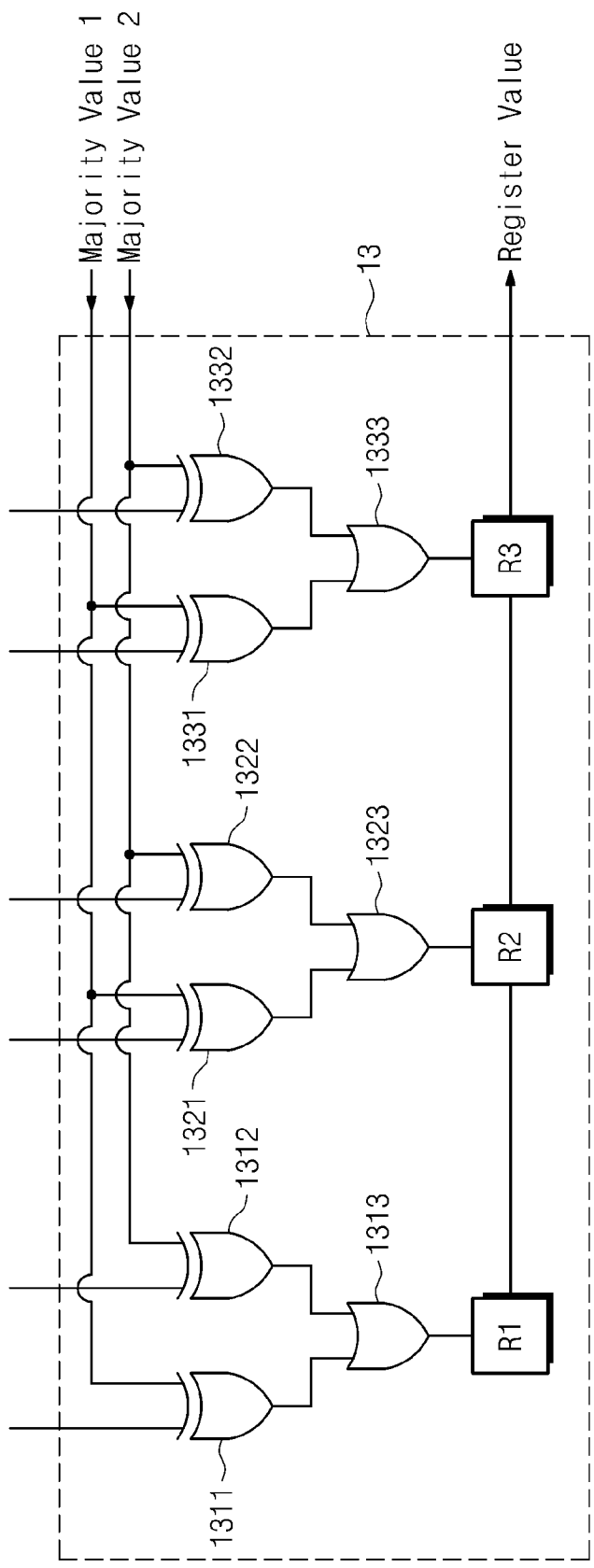
FIG. 6 is a circuit diagram illustrating a determination unit according to an embodiment of the present invention.

FIG. 6 is a circuit diagram illustrating the determination unit 13 according to an embodiment of the present invention.

As shown in FIG. 6, according to an embodiment of the present invention, the determination unit 13 includes XOR gates 1311, 1312, 1321, 1322, 1331, and 1332 performing an XOR operation on a test response value outputted from a core and a majority value outputted from a majority analyzer. The XOR gates 1311, 1312, 1321, 1322, 1331, and 1332 compare a test response value and a majority value and then output 0 if the two values are the same and output 1 if not. In this embodiment, the determination unit 13 compares a test response value outputted from a core and a majority value through an XOR gate but may use a variety of methods to compare the two values.

According to an embodiment of the present invention, the determination unit 13 may further include a register for storing an output value of an XOR gate. The test device connected to the multi-core device 100 reads a value stored in the register and individually diagnoses whether each core fails.

Furthermore, as shown in FIG. 2, when each core includes a plurality of scan chains, the determination unit 13 may include a plurality of XOR gates performing an XOR operation on a test response value outputted from each scan chain and a majority value for a corresponding scan chain and an OR gate performing an OR operation on output values of the plurality of XOR gates.

For example, as shown in FIG. 6, the determination unit 13 may include XOR gates 1311, 1312, 1321, 1322, 1331, and 1332 corresponding to the number of scan chains 1111, 1112, 1121, 1122, 1131, and 1132 in the plurality of cores 111, 112, and 113 and also may receive a test response value outputted from a corresponding scan chain in one-to-one correspondence to the scan chain. Additionally, the XOR gate receives a majority value for a corresponding scan chain from the majority analyzer 12 and performs an XOR operation on a test response value and the majority value.

Moreover, output values of a plurality of XOR gates corresponding to a plurality of scan chains in one core may be inputted to one OR gate. That is, the OR gate may one-to-one correspond to a core.

For example, as shown in FIG. 6, an output value of the XOR gate 1 1311 receiving a test response value from the scan chain 1 1111 of the core 1 111 and an output value of the XOR gate 2 1312 receiving a test response value from the scan chain 2 1112 of the core 1 111 may be inputted to the OR gate 1 1313. In the same manner, in relation to the core 2 112 and the core 3 113, output values of a plurality of XOR gates may be inputted to one OR gate. The OR gates 1313, 1323, and 1333 perform an OR operation on the received output values of the XOR gates and then output them.

As shown in FIG. 6, according to an embodiment of the present invention, the determination unit 13 may further include registers R1, R2, and R3 for storing output values of the OR gates 1313, 1323, and 1333. A test device connected to the multi-core device 100 may read values stored in the registers R1, R2, and R3 and then separately diagnose whether each core fails.

Figure 7:
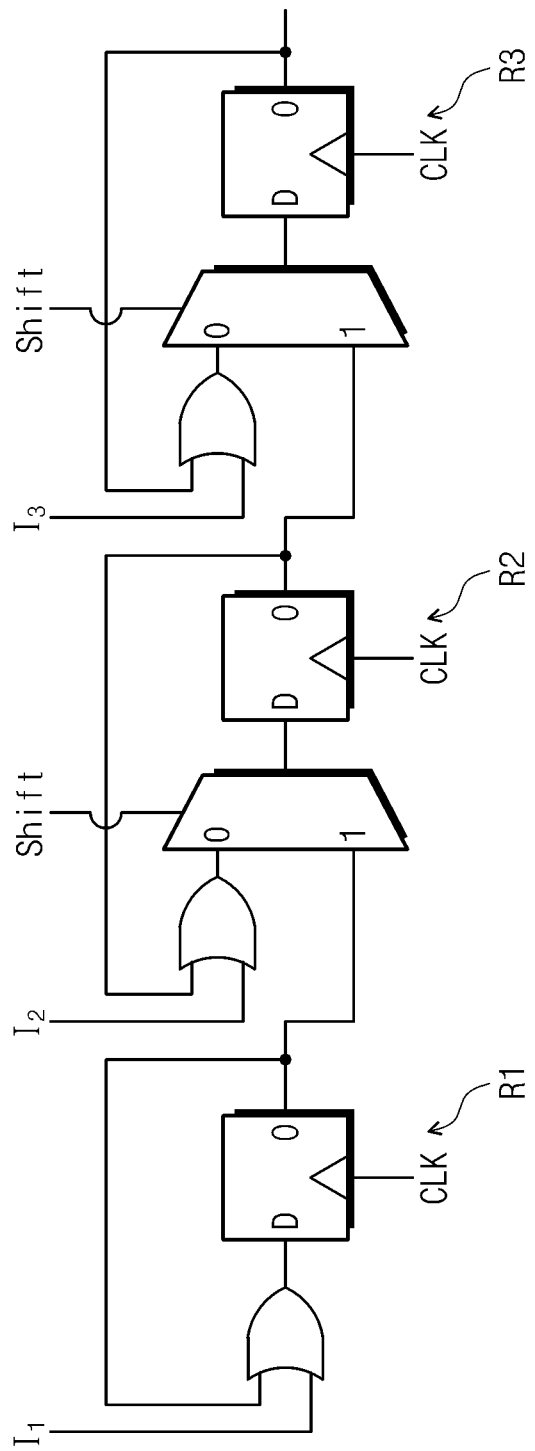
FIG. 7 is a circuit diagram illustrating a register according to an embodiment of the present invention.

FIG. 7 is a circuit diagram illustrating the registers R1, R2, and R3 according to an embodiment of the present invention.

As shown in FIG. 7, the registers R1, R2, and R3 receive output values $I_1$, $I_2$, and $I_3$ of the OR gates 1313, 1323, and 1333 corresponding to each core shown in FIG. 6 and then store them. According to an embodiment of the present invention, each register may be configured including a D flip-flop but the present invention is not limited thereto.

According to an embodiment of the present invention, each register may further include an OR gate receiving an output value of a D flip-flop as a feedback and performing an OR operation on the output value and $I_1$, $I_2$, and $I_3$. As a result, if a test response value and a majority value are different from each other at least once for each core, the register may continuously store and output a value of 1.

According to an embodiment of the present invention, the registers R1, R2, and R3 may be connected in chain and may output a 1 bit register value to the test device.

The register configuration shown in FIG. 7 is just one example and a variety of methods are used to store and output comparison data resulting from a comparison of a test response value of each core and a majority value.

Figure 8:
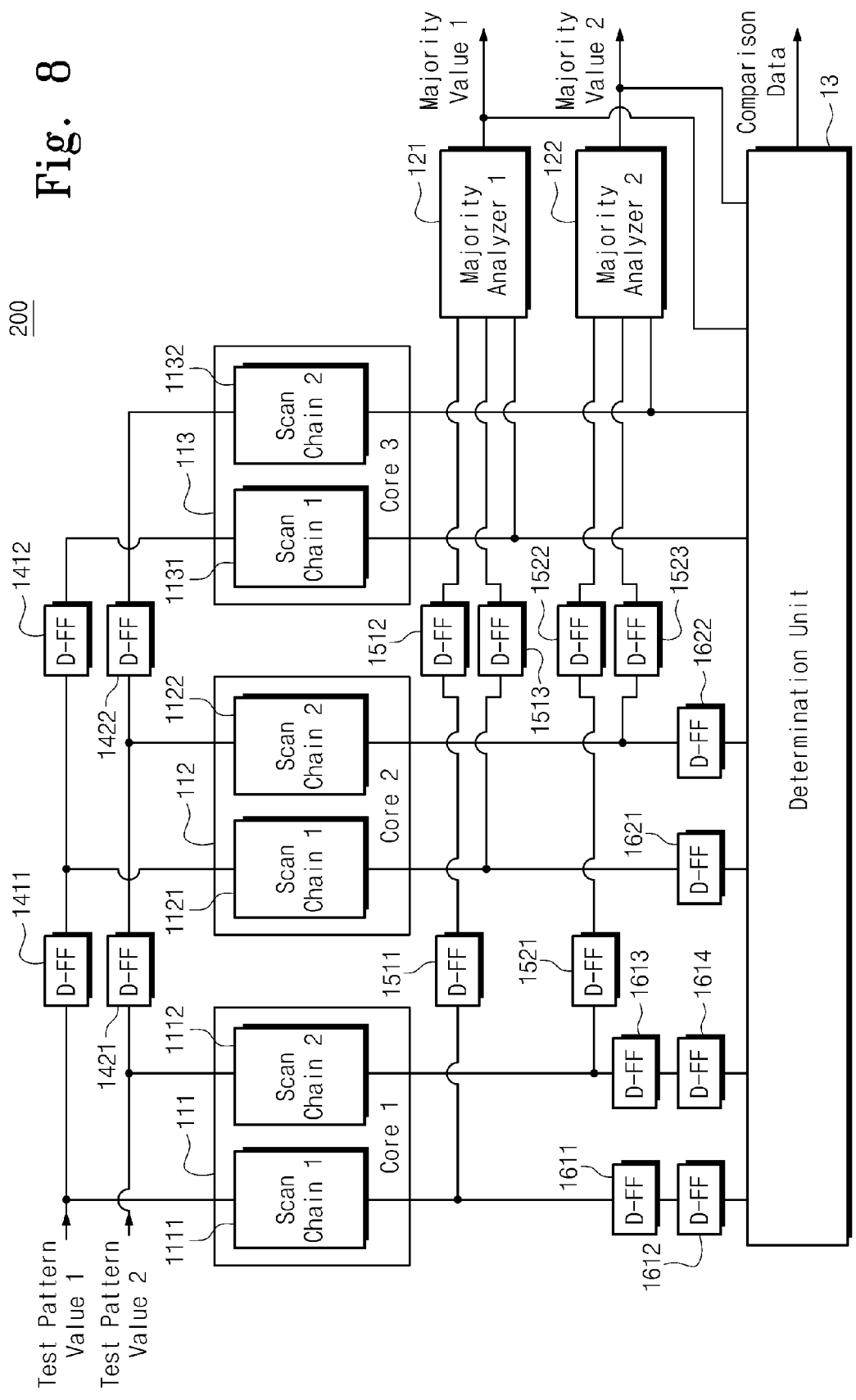
FIG. 8 is a block diagram illustrating a multi-core device according to another embodiment of the present invention.

FIG. 8 is a block diagram illustrating a multi-core device according to another embodiment of the present invention.

As shown in FIG. 8, the multi-core device 200 includes a plurality of cores 111, 112, and 113, majority analyzers 121 and 122, a determination unit 13, first adjustment units 1411, 1412, 1421, and 1422, second adjustment units 1511, 1512, 1513, 1521, 1522, and 1523, and third adjustments units 1611, 1612, 1613, 1614, 1621, and 1622.

The plurality of cores 111, 112, and 113, the majority analyzers 121 and 122, and the determination unit 13 are identical to those of FIG. 2.

The first adjustment units 1411, 1412, 1421, and 1422 may adjust an applying time of a test pattern value to allow the test pattern value to be sequentially inputted to each core. The second adjustment units 1511, 1512, 1513, 1521, 1522, and 1523 may adjust an applying time of a test response value to allow the test response value to be simultaneously inputted to the majority analyzers 121 and 122. The third adjustments units 1611, 1612, 1613, 1614, 1621, and 1622 may adjust an applying time of a test response value to allow the test response value to be simultaneously inputted to the determination unit 13.

According to an embodiment of the present invention, the first adjustment units 1411, 1412, 1421, and 1422 may include a buffer connected to input terminals of the cores 111, 112, and 113. According to an embodiment of the present invention, the second adjustment units 1511, 1512, 1513, 1521, 1522, and 1523 may include a buffer connected between output terminals of the cores 111, 112, and 113 and input terminals of the majority analyzers 121 and 122. According to an embodiment of the present invention, the third adjustments units 1611, 1612, 1613, 1614, 1621, and 1622 may include a buffer connected between output terminals of the cores 111, 112, and 113 and an input terminal of the determination unit 13.

According to an embodiment of the present invention, the buffer may include a D flip-flop but the present invention is not limited thereto.

In the multi-core device 100 shown in FIG. 2, a test pattern value is simultaneously inputted to the cores 111, 112, and 113 but in the multi-core device 200 shown in FIG. 8, a test pattern value is sequentially inputted to the cores 111, 112, and 113.

For example, according to an embodiment of the present invention shown in FIG. 8, test pattern values 1 and 2 are inputted to the core 1 111, inputted to the core 2 112 after one shift clock timing by the D flip-flops 1411 and 1421, and then inputted to the core 3 113 after one shift clock timing again by the D flip-flops 1412 and 1422.

As result, a test response value of the cores 111, 112, and 113 for the same test pattern value is delayed and outputted and the second adjustment units 1511, 1512, 1513, 1521, 1522, and 1523 and the third adjustments units 1611, 1612, 1613, 1614, 1621, and 1622 may adjust an applying time of a test response value to allow the output delayed test response value to be simultaneously inputted to the majority analyzers 121 and 122 and the determination unit 13.

For example, according to the embodiment shown in FIG. 8, a timing at which a test response value outputted from the scan chain 1 1111 of the core 1 111 is inputted to the majority analyzer 1 121 by the two D flip-flops 1511 and 1512 is delayed by two clocks. Also, a timing at which a test response value outputted from the scan chain 1 1121 of the core 2 112 is inputted to the majority analyzer 1 121 by one D flip-flops 1513 is delayed by one clock.

As a result, the majority analyzer 1 121 may receive a test response value from the scan chain 1 1111 of the core 1 111 and the scan chain 1 1121 of the core 2 112 at the timing of the test response value is outputted from the scan chain 1131 of the core 3 113. Likewise, the majority analyzer 2 122 also may simultaneously receive a test response value from the scan chain 2 1112 of the first core 1 111, the scan chain 2 1122 of the core 2 112, and the scan chain 1132 of the core 3 113 by the D flip-flops 1521, 1522, and 1523.

Furthermore, as shown in FIG. 8, a test response value inputted to the determination unit 13 may be delayed and inputted by the D flip-flops 1611, 1612, 1613, 1614, 1621, and 1622, so that a test response value outputted from the cores 111, 112, and 113 may be simultaneously inputted.

According to another embodiment of the present invention, the multi-core device 200 further connects a buffer to an input terminal and an output terminal of the cores 111, 112, and 113, so that it is easy to meet a test timing of cores and a test capture power may be distributed.

Furthermore, as described later, if a majority analyzer is configured with a sequential logic by using a counter, it has advantage in scalability according to the increase in the number of cores, compare to a combinational logic.

Figure 9:
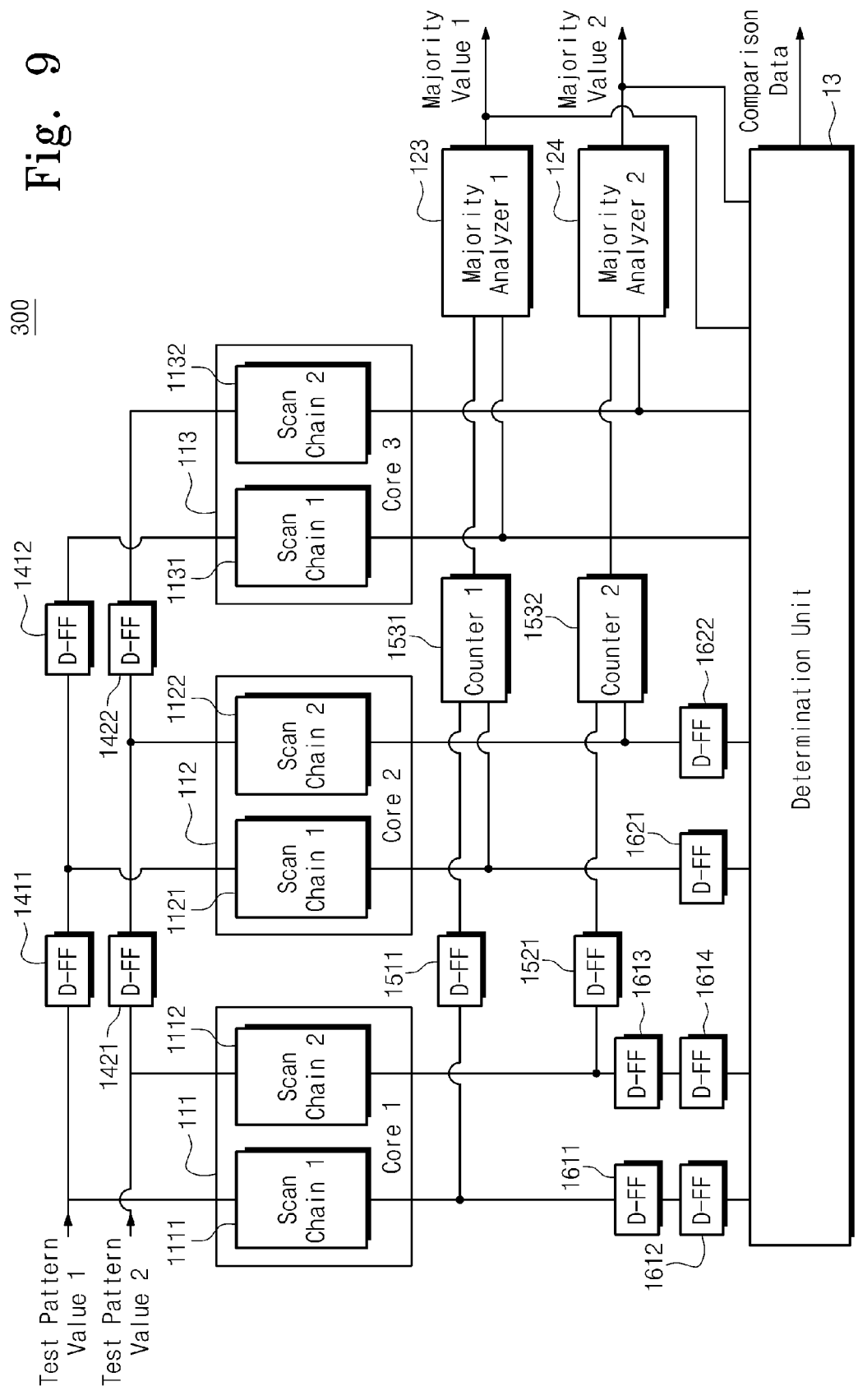
FIG. 9 is a block diagram illustrating a multi-core device according to another embodiment of the present invention.

FIG. 9 is a block diagram illustrating a multi-core device according to another embodiment of the present invention.

Unlike the multi-core device 200 of FIG. 8, a second adjustment unit includes counters 1531 and 1532 in the multi-core device 300.

The counters 1531 and 1532 receive test response values outputted from cores, for example, a core (for example, the core 1 of FIG. 9) to which a test pattern value is inputted first to a core (for example, the core 2 of FIG. 9) to which the test pattern value is inputted second from the last may count the number of 1's.

For example, according to the embodiment shown in FIG. 9, the counter 1 1531 receives a test response value outputted from the scan chain 1 1111 of the core 1 111 and a test response value outputted from the scan chain 1 1121 of the core 2 112 and then counts and outputs the number of 1's therein.

Unlike the embodiment of FIG. 9, if the multi-core device 300 includes four cores, a counter may be connected between an output terminal of the scan chain 1 1131 of the core 3 and an input terminal of the majority analyzer 123. The counter receives an output value of the counter 1 1531 connected to the output terminal of the scan chain 1 1121 of the core 2 and a test response value of the scan chain 1 1131 of the core 3and counts and outputs the number of 1's.

In the same manner, the counter counts and outputs the number of 1's in test response values from cores, for example, a core (for example, the core 1 of FIG. 9) to which a test pattern value is inputted first to a core (for example, the core 2 of FIG. 9) to which a test pattern value is inputted second from the last.

According to the embodiment of FIG. 9, although the D flip-flops 1511 and 1521 are connected to an output terminal of the core 1 to which a test pattern value is inputted first, a counter may be connected to a core to which the test pattern value is inputted first.

Moreover, according to the embodiment of FIG. 9, the majority analyzers 123 and 124 may receive output values of the counters 1531 and 1532 and a test response value of a core (for example, the core 3of FIG. 9) to which a test pattern value is inputted last.

Figure 10:
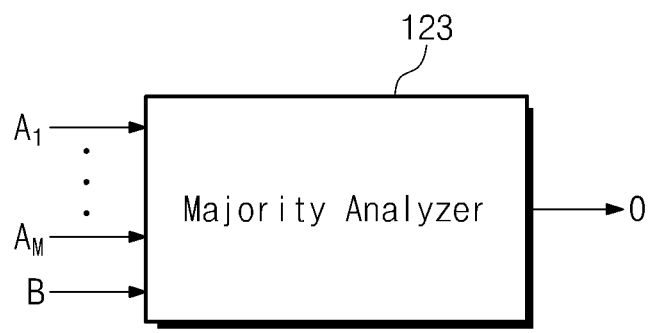
FIG. 10 is a view illustrating a majority analyzer according to another embodiment of the present invention.

FIG. 10 is a view illustrating the majority analyzer 123 according to another embodiment of the present invention.

Referring to FIG. 10, the majority analyzer 123 receive an output value of the counter 1531 through inputs $A_1$ to $A_M$ and receive a test response value of a core (for example, the core 3 of FIG. 9) to which a test pattern value is inputted last through an input B. Here, M and N have a relationship of $M = \log_2 N/2 + 1$. Accordingly, the majority analyzer 123 of FIG. 10 may have the less number of input terminals than the majority analyzer 121 shown in FIG. 3.

The majority analyzer 123 outputs 1 if an output value of the counter 1531 is greater than half of the number of cores and outputs 0 if an output value of the counter 1531 is less than half of the number of cores. If an output value of the counter 1531 is equal to half of the number of cores, the majority analyzer 123 outputs a test response value of a core (for example, the core 3 of FIG. 9) to which the test pattern value is inputted last FIG. 11 is a view illustrating an operation of the majority analyzer 123 according to another embodiment of the present invention.

Figure 11:
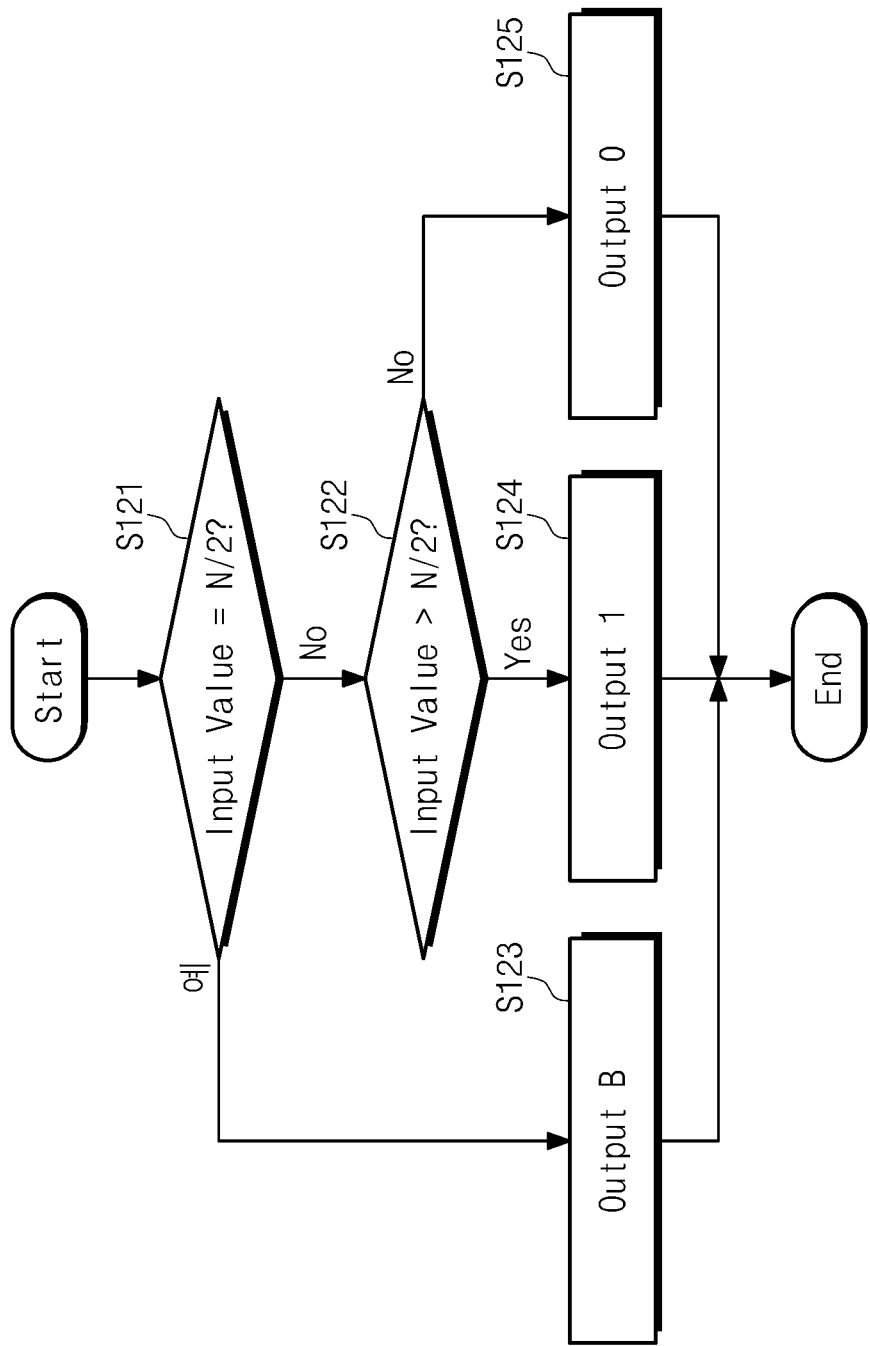
FIG. 11 is a view illustrating an operation of a majority analyzer according to another embodiment of the present invention.

According to the embodiment shown in FIG. 11, the majority analyzer 123 compares an output value of the counter 1531 inputted through the inputs $A_1$ to $A_M$ and N/2 (that is, half of the number of cores) and if they are identical to each other, outputs a test response value of the core 3113 inputted through the input B. Then, the majority analyzer 123 compares an output value of the counter 1531 and N/2 (that is, half of the number of cores) and if the output value is greater than N/2, outputs 1 and if the output value is less than N/2, outputs 0.

As a result, if the number of 1' in the received test response values is greater than the number of 0's, the majority analyzer 123 outputs 1 and if the number of 1' in the received test response values is less than the number of 0's, outputs 0. According to an embodiment of the present invention, the majority analyzer 123 may be designed to output 1 if the number of 1' in the received test response values is identical to the number of 0's.

The operation of the majority analyzer is not limited to the above embodiment and the majority analyzer may be designed to operate in various methods according to an embodiment of the present invention.

A majority value outputted from the majority analyzer 12 is inputted to a test device according to an embodiment of the present invention and may be used for core failure diagnosis.

Figure 12:
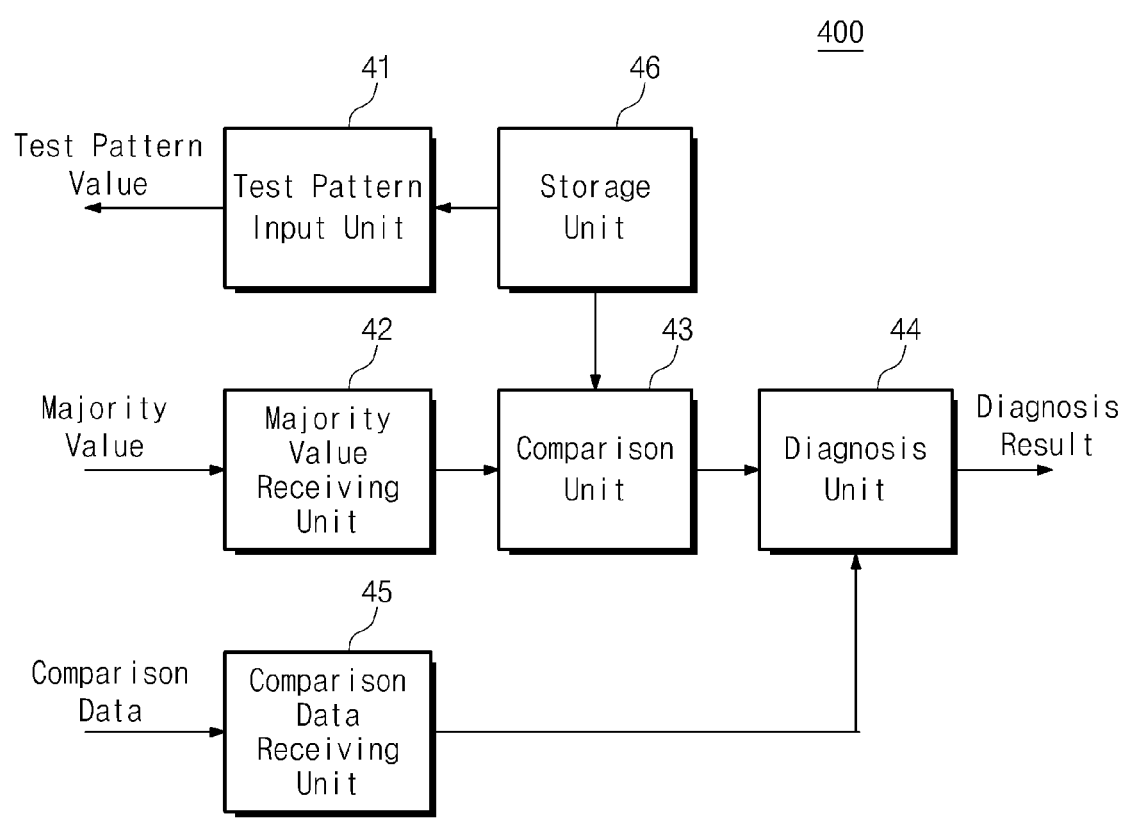
FIG. 12 is a block diagram illustrating a test device according to an embodiment of the present invention.

FIG. 12 is a block diagram illustrating a test device according to an embodiment of the present invention.

As shown in FIG. 12, the test device 400 includes a test pattern value input unit 41, a majority value receiving unit 42, a comparison unit 43, and a diagnosis unit 44. The test pattern value input unit 41 may input a test pattern value to a plurality of cores. The majority value receiving unit 42 may receive a majority value of a test response value outputted from the plurality of cores in response to the test pattern value. The comparison unit 43 compares the majority value and an expected value corresponding to the test pattern value. The diagnosis unit 44 may diagnose a failure of a plurality of cores according to a comparison result of the comparison unit 43.

According to an embodiment of the present invention, the test pattern value input unit 41 may input the same test pattern value to a plurality of cores. For example, the test pattern value input unit 41 may input the same test pattern value to the plurality of cores 111, 112, and 112 in the multi-core device 100 as shown in FIG. 1. Additionally, the test pattern value input unit 41 may simultaneously input a test pattern value to the plurality of cores 111, 112, and 113.

According to an embodiment of the present invention, the test pattern value input unit 41 may input a test pattern value to at least one scan chain included in each core. According to this embodiment, the test pattern value input 41 may input the same test pattern value to the same scan chain included in a plurality of cores.

For example, referring to the multi-core device shown in FIG. 2, the test pattern value input unit 41 may input a test pattern value 1 to the same scan chains 1 1111, 1121, and 1131 included in the plurality of cores 111, 112, and 113 and may output a test pattern value 2 to other same scan chains 2 1112, 1122, and 1132.

The majority value receiving unit 42 may receive a majority value from the majority analyzer 12 included in the multi-core device 200. As shown in FIG. 2, when a plurality of scan chains are included in one core, a majority value may be outputted from each scan chain. Accordingly, the authority value receiving unit 42 may receive an authority value from the authority analyzer 12 as many as the number of scan chains included in one core.

The comparison unit 43 compares an authority value and an expected value corresponding to a test pattern value and determines whether the majority value is identical to the expected value.

According to an embodiment of the present invention, the test device 400 may further include a storage unit 46 and may store the test pattern value and an expected value corresponding thereto in the storage unit 46. According to an embodiment of the present invention, instead of storing a test pattern value and an expected value, the test device 400 generates the test pattern value and an expected value corresponding thereto and then compares them and the majority value.

The diagnosis unit 44 may diagnose a failure of a plurality of cores on the basis of a comparison result of the majority value and the expected value.

According to an embodiment of the present invention, if the majority value and the expected value are different from each other, the diagnosis unit 44 may determine that the plurality of cores fail.

If a core does not fail, once a predetermined test pattern value is inputted, it is expected that a test response value identical to an expected value is outputted. Accordingly, a core outputting a test response value different from an expected value may be determined as being failed and if half of a plurality of cores included in a multi-core device fails, a corresponding chip may be regarded as being failed and discarded. Accordingly, if half of a plurality of cores outputs a test response value different from an expected value, a plurality of cores may be determined as being failed.

According to an embodiment of the present invention, the test device 400 may further include a comparison data receiving unit 45 receiving comparison data resulting from a comparison of a test response value outputted from each core and a majority value.

The comparison data receiving unit 45 may receive comparison data from the determination unit 13 in a multi-core device. For example, the comparison data receiving unit 45 may receive a register value read from the registers R1, R2, and R3 included in the determination unit 13.

According to an embodiment of the present invention, if the majority value is identical to the expected value, the diagnosis unit 44 may diagnose a failure of each core on the basis of the comparison data. According to an embodiment of the present invention, the diagnosis unit 44 determines a core outputting a test response value identical to the majority value as normal and a core outputting a test response value different from the majority value as being failed.

Moreover, according to an embodiment of the present invention, if the number of cores outputting a test response value different from the majority value is identical to the number of cores outputting a test response value identical to the majority value, the diagnosis unit 44 may determine the plurality of cores as being failed.

According to the above-mentioned embodiment of the majority analyzer 12, since the majority analyzer 12 outputs 0 if the number of 0' is identical to the number of 1' in the received test response values, if an expected value for a corresponding test pattern is 0, a plurality of cores are not determined as being failed. Therefore, the diagnosis unit 44 confirms the case that half of a plurality of cores are failed during an individual core diagnosis and determines a corresponding chip as being failed.

Figure 13:
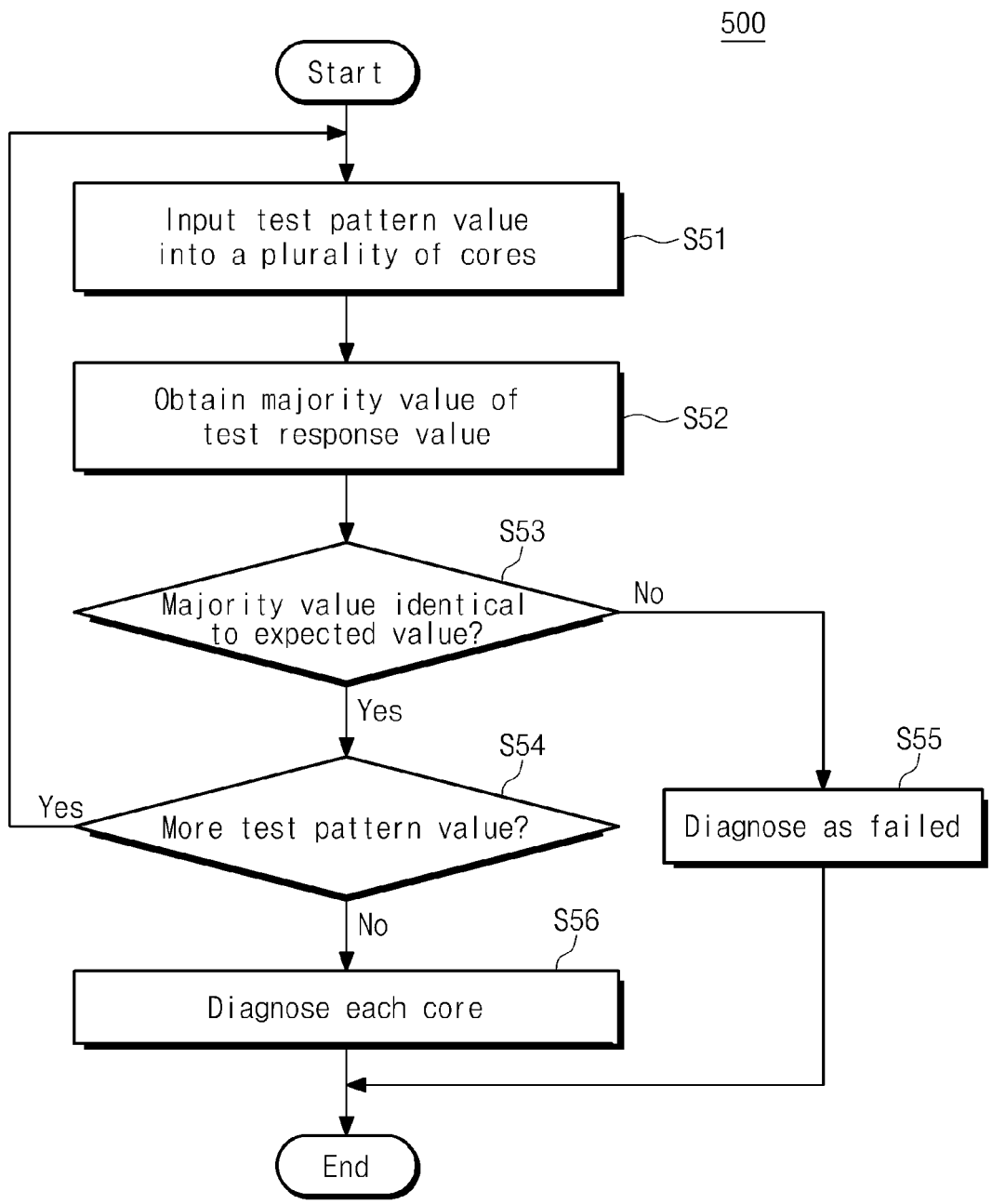
FIG. 13 is a flowchart illustrating a failure diagnosing method according to an embodiment of the present invention.

FIG. 13 is a flowchart illustrating a failure diagnosing method according to an embodiment of the present invention.

As shown in FIG. 13, the failure diagnosing method 500 includes operation S51 for inputting a test pattern value to a plurality of cores, operation S52 for obtaining a majority value of test response values outputted from a core in response to the test pattern value, operation S53 for comparing the majority value and an expected value corresponding to the majority value, and an operation for diagnosing a failure of a plurality of cores according to a comparison result.

The failure diagnosing method 500 may be performed by the test device 400 according to the above-mentioned embodiment of the present invention.

According to an embodiment of the present invention, the diagnosing operation may include operation S55 for determining the plurality of cores as being failed if the majority value is different from the expected value (NO in operation S53). If the majority value is different from the expected value, since a majority of a plurality of cores in a test target chip is regarded as being failed, in the case, a corresponding chip may be determined as being failed.

According to an embodiment of the present invention, the failure diagnosing method 5000 may diagnose a failure by inputting a plurality of test patterns into a test target chip. For example, as shown in FIG. 13, the failure diagnosing method 500 obtains a majority value by inputting one test pattern value and compares the majority value and an expected value for a corresponding test pattern value so as to perform a failure diagnosing operation on a plurality of test pattern values repeatedly in operation S54.

In this embodiment, if a majority value obtained by inputting an arbitrary test pattern value is different from an expected value, the diagnosing operation may determine a corresponding chip as being failed and stops a failure diagnosis. On the contrary, if a majority value is identical to an expected value with respect to all of a plurality of test pattern values, the diagnosing operation may include operation S56 for separately diagnosing a failure of each core.

According to an embodiment of the present invention, the failure diagnosing method 500 may further include obtaining comparison data resulting from a comparison of a test response value outputted from each core and the majority value. An individual diagnosing operation described later may be performed on the basis of the comparison data.

Figure 14:
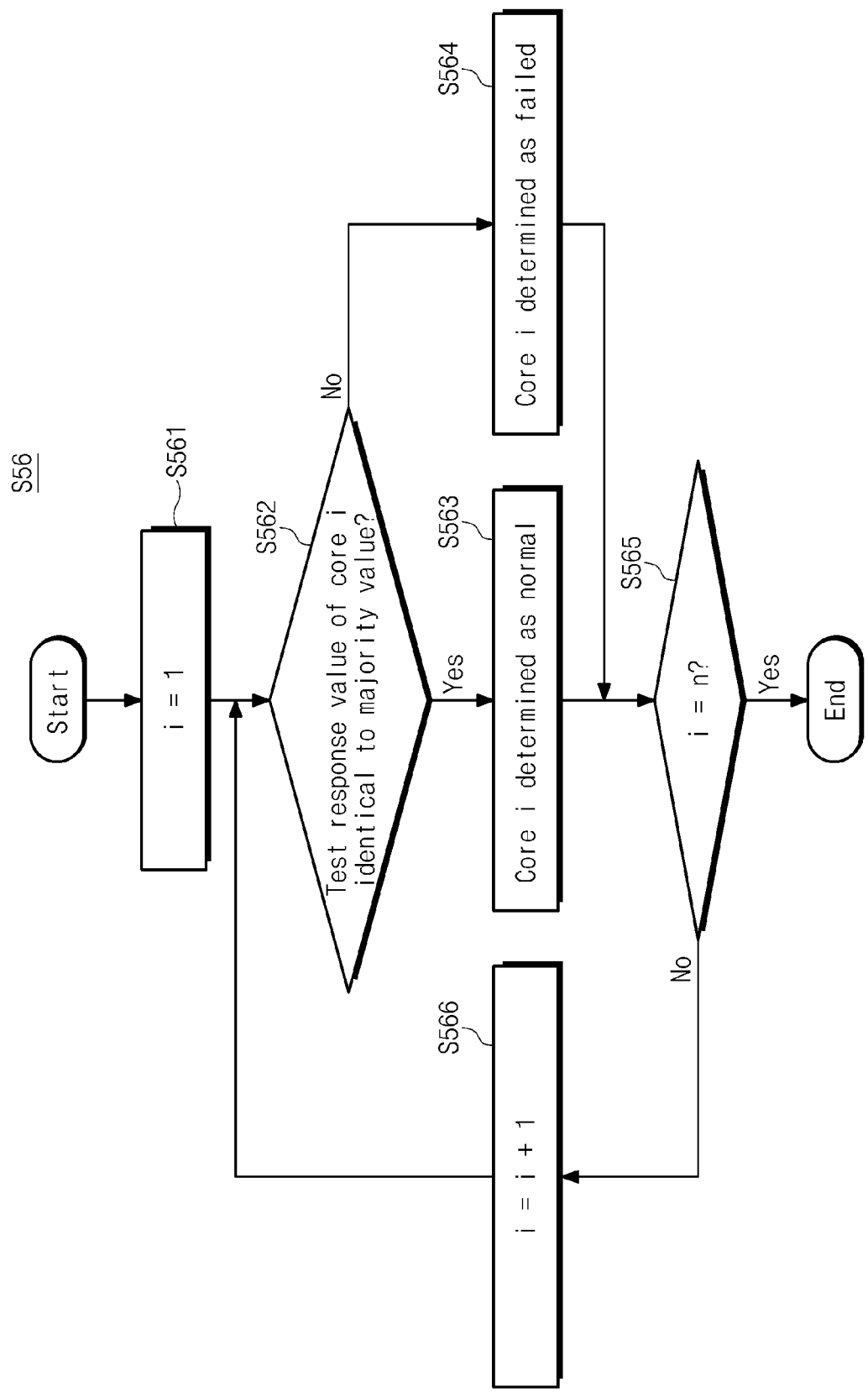
FIG. 14 is a flowchart illustrating an individual core diagnosing operation according to an embodiment of the present invention.

FIG. 14 is a flowchart illustrating an individual core diagnosing operation according to an embodiment of the present invention.

According to an embodiment of the present invention, operation S56 for diagnosing each core may include operation S563 for determining a core outputting a test response value identical to the majority value as normal and operation S564 for determining a core outputting a test response value different from the majority value as being failed.

For example, when the test device 400 reads comparison data obtained by comparing a test response value outputted from each core and the majority value, from the registers R1, R2, and R3 included in the determination unit 13, it may determined a core corresponding to a register storing 1 as being failed and a core corresponding to a register storing 0 as normal.

Moreover, according to an embodiment of the present invention, operation S56 for diagnosing each core may further include determining the plurality of cores as being failed if the number of cores outputting a test response value different from the majority value is equal to or greater than the number of cores outputting a test response value identical to the majority value.

For example, if the number of registers storing 1 is equal to or greater than the number of registers storing 0 on the basis of the comparison data, the test device 400 may determine a corresponding chip as being failed.

The failure diagnosing method according to the above-mentioned embodiment of the present invention may be implemented by a program executed on a computer and stored on a computer readable recording medium. Examples of the computer readable recording medium include read-only memory (ROM), random-access memory (RAM), CD-ROMs, magnetic tapes, floppy disks, and optical data storage devices.

As mentioned above, a method of diagnosing a failure of a plurality of cores by using a value corresponding to a majority of test response values outputted from the plurality of cores is described. According to an embodiment of the present invention, even if the number of cores is increased, a multi-core device may be diagnosed with a test pin and test time required for testing one core.

According to an embodiment of the present invention, even if the number of cores is increased, the number of test pins is not increased.

According to an embodiment of the present invention, even if the number of cores is increased, a test time is not increased.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multi-core processor hardware device comprising:
a plurality of processor cores each configured to output a test response value by receiving a test pattern value;
a majority analyzer configured to output a value corresponding to a majority of the test response value by analyzing the test response value; and
a determination unit configured to determine a processor core outputting a test response value different from the value corresponding to a majority among the plurality of processor cores,
wherein each of the plurality of processor cores comprises at least one scan chain, and wherein if each processor core comprises a plurality of scan chains, the determination unit comprises,
a plurality of XOR gates configured to perform an XOR operation on a test response value outputted from each scan chain and a value corresponding to a majority for a corresponding scan chain; and
an OR gate configured to perform an OR operation on output values of the plurality of XOR gates.

2. The multi-core processor hardware device of claim 1, wherein the determination unit further comprises a register configured to store an output value of the OR gate.

3. A multi-core processor hardware device comprising:
a plurality of processor cores configured to output a test response value by receiving a test pattern value;
a majority analyzer configured to output a value corresponding to a majority of the test response value by analyzing the test response value;
a determination unit configured to determine a processor core outputting a test response value different from the value corresponding to a majority among the plurality of processor cores;
a first adjustment unit configured to adjust an applying time of the test pattern value to allow the test pattern value to be sequentially inputted to each processor core;
a second adjustment unit configured to adjust an applying time of the test response value to allow the test response value to be simultaneously inputted to the majority analyzer; and
a third adjustment unit configured to adjust an applying time of the test response value to allow the test response value to be simultaneously inputted to the determination unit.

4. The multi-core processor hardware device of claim 3, wherein the first adjustment unit comprises a buffer connected to an input terminal of a processor core.

5. The multi-core processor hardware device of claim 4, wherein the buffer comprises a D flip-flop.

6. The multi-core processor hardware device of claim 3, wherein the second adjustment unit comprises a buffer connected between an output terminal of a processor core and an input terminal of the majority analyzer.

7. The multi-core processor hardware device of claim 3, wherein the third adjustment unit comprises a buffer connected between an output terminal of a processor core and an input terminal of the determination unit.

8. The multi-core processor hardware device of claim 3, wherein the second adjustment unit comprises a counter configured to count the number of 1's among test response values from a processor core to which the test pattern value is inputted first to a processor core to which the test pattern value is inputted second from the last.

9. The multi-core processor hardware device of claim 8, wherein the majority analyzer is configured to receive a test response value of a processor core to which the test pattern value is inputted last and an output value of the counter.

10. The multi-core processor hardware device of claim 9, wherein the majority analyzer is configured to,
output 1 if the output value of the counter is greater than half the number of processor cores,
output 0 if the output value of the counter is less than half the number of processor cores, and
output a test response value of a processor core to which the test pattern value is inputted last if the output value of the counter is identical to half the number of processor cores.

11. A hardware test-device comprising:
a test pattern value input unit configured to input a test pattern value to a plurality of processor cores;
a majority value receiving unit configured to receiving a value corresponding to a majority of a test response value outputted from the plurality of processor cores in response to the test pattern value;
a comparison unit configured to comparing the value corresponding to the majority and an expected value corresponding to the test pattern value; and
a diagnosis unit configured to diagnosing a failure of the plurality of processor cores according to a comparison result of the comparison unit.

12. The hardware test-device of claim 11, wherein the test pattern value input unit is configured to input the same test pattern value to the plurality of processor cores.

13. The hardware test-device of claim 11, wherein the test pattern value input unit is configured to simultaneously input the test pattern value to the plurality of processor cores.

14. The hardware test-device of claim 11, wherein the comparison unit is configured to output a signal notifying that the value corresponding to the majority is identical to the expected value.

15. The hardware test-device of claim 11, wherein the diagnosis unit is configured to determine the plurality of processor cores as failed if the value corresponding to the majority is different from the expected value.

16. The hardware test-device of claim 11, further comprising a comparison data receiving unit configured to receive comparison data obtained by comparing a test response value outputted from each processor core and the value corresponding to the majority.

17. The hardware test-device of claim 16, wherein the diagnosis unit is configured to diagnose the failure of each processor core on the basis of the comparison data when the value corresponding to the majority is identical to the expected value.

18. The hardware test-device of claim 17, wherein the diagnosis unit is configured to determine a processor core outputting a test response value identical to the value corresponding to the majority as normal and determines a processor core outputting a test response value different from the value corresponding to the majority as failed.

19. The hardware test-device of claim 16, wherein the diagnosis unit is configured to determine the plurality of processor cores as failed if the number of processor cores outputting a test response value identical to the value corresponding to the majority is identical to the number of processor cores outputting a test response value different from the value corresponding to the majority.

20. A failure diagnosing method comprising:
inputting a test pattern value to a plurality of processor cores;
obtaining a value corresponding to a majority of a test response value outputted in response to the test pattern value;
comparing the value corresponding to the majority and an expected value corresponding to the test pattern value; and
diagnosing a failure of the plurality of processor cores according to a comparison result.

21. The method of claim 20, wherein the diagnosing of the failure comprises determining the plurality of processor cores as failed when the value corresponding to the majority is different from the expected value.

22. The method of claim 20, further comprising obtaining comparison data resulting from comparing a test response value outputted from each processor core and the value corresponding to the majority.

23. The method of claim 22, wherein the diagnosing of the failure comprises separately diagnosing a failure of each processor core on the basis of the comparison data if the value corresponding to the majority is identical to the expected value.

24. The method of claim 23, wherein the diagnosing of the failure separately comprises:
   determining a processor core outputting a test response value identical to the value corresponding to the majority as normal; and
   determining a processor core outputting a test response value different from the value corresponding to the majority as failed.

25. The method of claim 23, wherein the diagnosing of the failure separately further comprises determining the plurality of processor cores as failed if the number of processor cores outputting a test response value identical to the value corresponding to the majority is identical to the number of processor cores outputting a test response value different from the value corresponding to the majority.

26. A non-transitory computer readable recording medium having computer readable instructions stored thereon, which when executed by at least one processor, causes the at least one processor to implements the method of claim 20.

* * * * *